United States Patent Office 2,710,822
Patented June 14, 1955

2,710,822

MANGANOUS ETHYLENE BIS-DITHIOCARBAMATE FUNGICIDE COMPOSITION AND METHOD OF APPLYING

David R. V. Golding and Bert Lorin Richards, Jr., Wilmington, Del., assignors to E. I. du Pont de Nemours & Company, Wilmington, Del., a corporation of Delaware No Drawing. Application January 13, 1953,
Serial No. 331,103

4 Claims. (Cl. 167—22)

This invention relates to fungicidal compositions and methods and is more particularly directed to fungicidal compositions and methods employing manganous ethylene bisdithiocarbamate as a fungicidally active ingredient in admixture with water soluble methylcellulose.

The value of manganous ethylene bisdithiocarbamate as a fungicidally active material is well known and its manufacture and composition for this purpose are disclosed in U. S. Patent 2,504,404.

The present invention relates to improved fungicidal compositions and methods based on manganous ethylene bisdithiocarbamates, the improvement being realized by incorporating in the prior art compositions a water soluble methylcellulose. We have found that water soluble methylcellulose coacts or co-operates in applications of manganous ethylene bisdithiocarbamate fungicidal compositions in some manner, the mechanism of which is not yet understood, to reduce very markedly the phytotoxic action that prior art manganous ethylene bisdithiocarbamate compositions displayed on some plants.

Additionally, the methylcellulose modified compositions of the invention retain their fungicidal activity following application much longer than do the prior art unmodified compositions, that is, they have greater residual action.

Methylcellulose is a product of commerce and is sold currently under the proprietary name "Methocel." It is an ether of cellulose formed by interaction of the methyl ester of an inorganic acid, for example, methyl chloride, with alkali cellulose. The solubility characteristics of methylcelluloses vary widely with the degree of methylation. The kind of methycellulose suitable for use in the compositions of this invention are those which are classed in trade as soluble in cold water. The preparation of methylcelluloses in general, and the characteristics and properties of water soluble methylcellulose in particular, are disclosed in "Colloidal Chemistry," volume VI, pages 926-8 (Reinhold Publishing Corp., 1946).

Compositions of the invention are prepared by bringing together the manganous ethylene bisdithiocarbamate and the water soluble methylcellulose in any convenient manner to give an intimate mixture. Thus, the fungicidal agent and the methylcellulose can be brought together as dry solids and dry blended using conventional mixing equipment such as a ribbon blender. Alternatively, the methylcellulose can be dissolved in water to which particulate solid manganous ethylene bisdithiocarbamate has been or is subsequently added, or in which it is precipitated, to form a dispersion of the dithiocarbamate in an aqueous solution of the methylcellulose, such aqueous mixture then being adapted for application for fungus control after adjusting the concentration of active ingredient as may be desired by addition of water.

The methylcellulose need be employed only in minor amounts in order to obtain the benefits of the compositions of the invention. The amount used, however, can be varied widely. Ordinarily from about 0.25 to 5 parts by weight of methylcellulose per 100 parts by weight of the manganous ethylene bisdithiocarbamate component is used.

There can be included in the compositions in addition to the manganous ethylene bisdithiocarbamate and the water soluble methylcellulose, various conventional diluent or extender materials, conditioning or adjuvant materials, and other biologically active ingredients such, for example, as the carriers, adjuvants, and toxicant materials disclosed or referred to in the aforementioned U. S. Patent 2,504,404.

The compositions of the invention are suitably applied for the control of fungus infections of plants by applying them in fungicidally effective amounts to the plants according to the prior art teachings as dusts or aqueous dispersions using conventional dusting or spray applicator equipment. For optimum control, the applications are made prior to the fungus infection altho application after the infection has occurred is also valuable because manganous ethylene bisdithiocarbamate has a curative action.

In order that the invention may be better understood, the following examples are given in addition to the examples already given above.

Example 1

Technical manganous ethylene bisdithiocarbamate was mixed with a methylcellulose ("Methocel," 15 cps.) to give a composition containing about 0.5% of the methylcellulose and 95.5% technical manganous ethylene bisdithiocarbamate.

The powdered composition of this example was dispersed in water to give a spray composition containing 8 pounds of manganous ethylene bisdithiocarbamate per 100 gallons of spray composition. This aqueous composition was sprayed on five-week old tomato plants. Immediately following each spray application and while still wet, the plants were placed in a humidity chamber and held for 1 hour at 100% relative humidity and 78–80° F. Three days later, another application of the same composition was made to the same plants, and five days after the second application, a third application was made to the plants.

Two days following the third application, the plants were observed and rated for foliage injury. Very little plant injury was apparent whereas similar plants treated in the same manner with unmodified technical manganous ethylene bisdithiocarbamate showed moderate to severe injury.

Example 2

This example illustrates the improved residual action of the compositions of the invention.

Technical manganous ethylene bisdithiocarbamate was dry mixed with a water soluble methylcellulose ("Methocel," 15 cps.) to give a composition containing 2% of the methylcellulose and 98% technical manganous ethylene bisdithiocarbamate.

The composition of the example was dispersed in water to give a spray composition containing 0.4 pound of manganous ethylene bisdithiocarbamate per 100 gallons of aqueous composition. The aqueous composition was sprayed on potted bean plants in the primary leaf stage.

Several hours after the sprays had dried on the plants, the plants were placed in a humidity chamber and held overnight at 76° F. in 100% relative humidity. The plants were then exposed to one and one-quarter inches of artificial rain. This exposure to artificial rain was repeated the following night and day and then the plants were inoculated by atomizing them with a suspension of bean rust spores (*Uromyces appendiculatus*).

Following inoculation, the plants were incubated for 20 hours in a humidity chamber at 100% relative humidity and 65° F. Control of the bean rust disease was determined by counting the number of bean rust lesions developed on the sprayed plant leaves, then counting the lesions on unsprayed control plants which had been otherwise similarly treated, and expressing the control of the disease in terms of percentage.

The plants treated with the composition of the example were only 7% as diseased as the untreated control plants. In contrast, in tests similarly conducted with unmodified technical manganous ethylene bisdithiocarbamate, there was four times as much disease on the plants as on those treated with the composition of the example.

Water soluble methylcellulose is available commercially in several types or grades identified by different viscosity numbers, for example, as 15 cps., 100 cps., 1500 cps., and so forth. These numbers represent viscosities as measured using a Ubbelohde viscometer with a 2% solution in water of the methylcellulose at 20° C.

While the invention has been illustrated in the specific examples above by use of 15 cps. methylcellulose, we have found that the viscosity of the methylcellulose is not a critical factor in preparing compositions of the invention and realizing the benefits therefrom. Water soluble methylcelluloses are suitable for use in the compositions of the invention regardless of their viscosity measurements.

I claim:

1. A fungicidal composition comprising manganous ethylene bisdithiocarbamate as a fungicidally active ingredient in admixture with water soluble methylcellulose.

2. A fungicidal composition comprising particulate solid manganous ethylene bisdithiocarbamate dispersed in an aqueous solution of methylcellulose.

3. A method for the control of fungus infections of plants which comprises applying to the plants a composition containing manganous ethylene bisdithiocarbamate in admixture with water soluble methylcellulose.

4. A method for the control of fungus infections of plants which comprises applying to the plants a composition containing manganous ethylene bisdithiocarbamate dispersed as a particulate solid in an aqueous solution of methylcellulose.

References Cited in the file of this patent

UNITED STATES PATENTS

| | | |
|---|---|---|
| 2,216,045 | Powers | Sept. 24, 1940 |
| 2,416,460 | Smith et al. | Feb. 25, 1947 |
| 2,504,404 | Flenner | Apr. 18, 1950 |
| 2,556,888 | Smith | June 12, 1951 |

FOREIGN PATENTS

| | | |
|---|---|---|
| 613,928 | Great Britain | Dec. 7, 1948 |
| 671,996 | Great Britain | May 14, 1952 |
| 226,792 | Switzerland | July 16, 1943 |